J. SWART.
Corn and Potato Coverer.

No. 80,680.

2 Sheets—Sheet 1.

Patented Aug. 4, 1868.

J. SWART.
Corn and Potato Coverer.
No. 80,680. Patented Aug. 4, 1868.
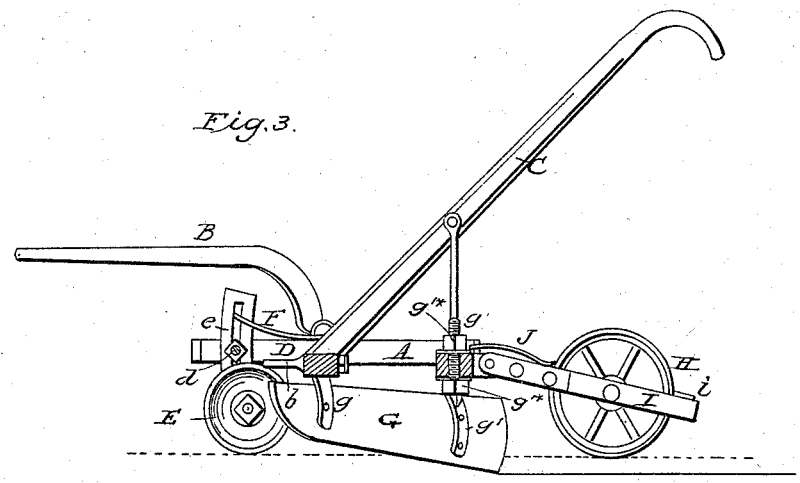
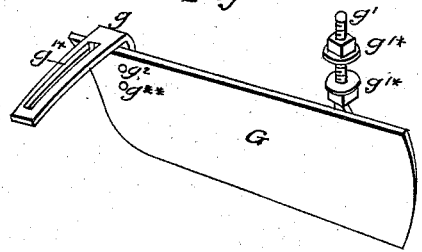
Witnesses.
W. B. Deming.
W. H. Brereton.
Inventor.
James Swart

UNITED STATES PATENT OFFICE.

JAMES SWART, OF HOFFMAN'S FERRY, NEW YORK.

IMPROVEMENT IN CORN AND POTATO COVERERS.

Specification forming part of Letters Patent No. 80,680, dated August 4, 1868.

*To all whom it may concern:*

Be it known that I, JAMES SWART, of Hoffman's Ferry, in the county of Schenectady and State of New York, have invented a new and useful Improvement in Corn and Potato Coverers; and I do hereby declare that the following is a full, clear, and exact description thereof, reference being had to the accompanying drawings, which are made a part of this specification.

My invention relates to a machine for covering and rolling corn, potatoes, &c., planted in hills or drills, or to that part of a planter whose functions are those.

My improvements consist in the novel construction and arrangement of the several parts, and also in the manner of adjusting the depth and working capacity of the machine.

Figure 1:
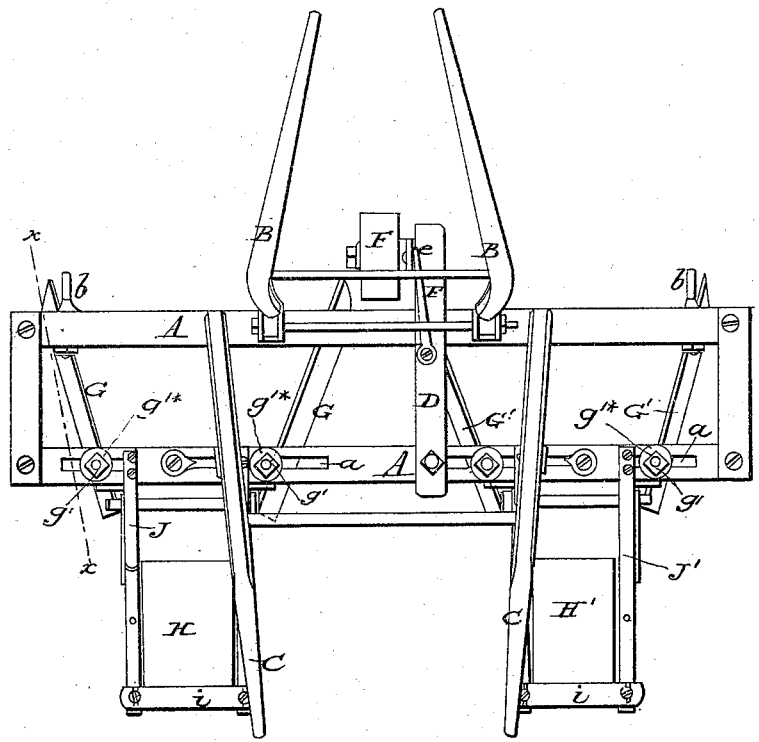
Figure 2:
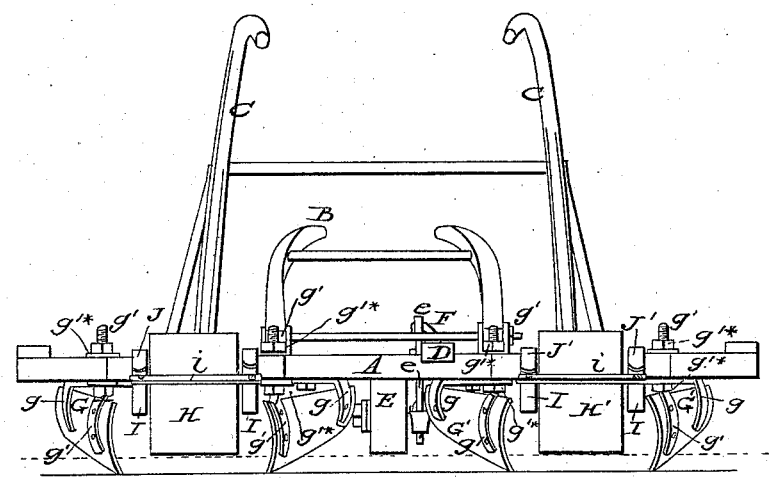

In the drawings, Figure 1 represents a plan view of my improved machine. Fig. 2 is a rear elevation. Fig. 3 is a sectional side elevation with the plane of section at $x\,x$, Fig. 1; and Fig. 4 is a perspective view of one of the covering shares or scrapers detached.

A may represent a rectangular frame, having suitable perforations, &c., for the reception of the different parts.

B represents the shafts or thills, between which the draft-animal is attached, and $b\,b$ hooks or staples for the attachment of the traces of the animal.

C C are the handles by which the machine is guided.

D is a longitudinal bar attached to the upper side of the frame A, near its center, for the attachment of a lead-wheel, E, whose slotted standard $e$ is secured to it by means of a bolt, $d$.

F is a hook pivoted to the upper side of the bar D, and engaging with the slot in the standard $e$ of the lead-wheel, for the purpose of supporting said wheel in its vertical position.

G G and G' G' represent two pairs of shares or scrapers, attached to the under side of the frame A in suitable position to embrace two adjacent rows, their function being to scrape the soil from each side of the row over the planted seed. The amount of soil thrown over the row is regulated by their depth and the distance between them, provisions for adjusting which are made as follows:

$g$ is a brace or angle-iron, attached by a rivet or bolt, $g^{**}$, to the front end of said shares, its vertical position being capable of adjustment by means of the additional perforation $g^2$. It is provided with a longitudinal slot, $g^*$, for the reception of the bolt by which it is secured to the frame A. $g'$ is a bolt attached to their rear end, similarly to $g$, and having its threaded portion provided with a pair of nuts, $g'^*$, which bear, respectively, on the lower and upper surfaces of the frame A on the sides of the slot $a$, provided for the reception of the bolt.

By means of the nuts $g'^*$ on the bolts $g'$ and the perforations $g^2$, the shares may be readily adjusted and held at any desired depth, and the adjustments $g^*\,a$ adapt them to be set so as to gather a greater or less quantity of earth and deposit it more or less thickly over the seed, as desired. The vertical adjustment of the wheel E also serves, by elevating or depressing the front end of the frame, and with it the front end of the shares G G, to further regulate the action of said shares. The shares G G' may be made of any suitable material and of substantially the form represented, their front end being narrow and rounding and their rear end of sufficiently-increased thickness to adapt them to cut at the maximum depth. I also prefer to make them perfectly straight in their longitudinal and slightly curved in their vertical plane, as the form requiring the least draft, and distributing the earth over the seed in a superior manner.

H H' are rollers, mounted in frames I I', hinged to the rear edge of the frame A, directly behind the coverers, and employed to compress the earth over the seed. The rear crossbar, $i$, of said frames forms a scraper to remove any soil which may adhere to the rollers.

J J' are springs attached to the frame A, and bearing on the roller-frames H H', for the purpose of steadying the movement of the rollers and adapting them to pass over obstructions without elevating the coverers. They also serve to give the operator a bearing on the frame, so that by a slight lift on the handles C the shares may be thrown entirely out of the ground, and the machine, then resting on the wheel E and rollers H H', be turned as on a pivot.

I propose locating the wheel or roller E, or its equivalent, at the ends, instead of the front, of the frame, when desired, and in either case making it in the form of a caster, when preferred. I also propose locating one or more seed-hoppers and dropping arrangements of any suitable construction on the frame A, and driving the droppers by means of either of the rollers.

I propose with my machine to cover two rows at the same time with one horse, (the form represented,) or three or five rows with two horses.

Having thus described my invention, the following is what I claim as new therein and desire to secure by Letters Patent:

1. The covering-shares G G', constructed as represented and described, and provided with the adjustments $g\ g^*\ a$ and $g'\ g'^*\ g^2$, substantially as and for the purpose set forth.

2. The combined arrangement of the adjustable lead-wheel E, shares or scrapers G G', and spring-rollers H H', all substantially as described, for the purpose specified.

3. The springs J J', in combination with the frames A I, and rollers H H', arranged and operating substantially as and for the purpose described.

4. The combination of the handles C, main frame A, hinged frame I, rollers H, and wheel E, all arranged to operate substantially as herein set forth.

JAMES SWART.

Witnesses:
W. B. DEMING,
W. H. BRERETON.